Figure 1:
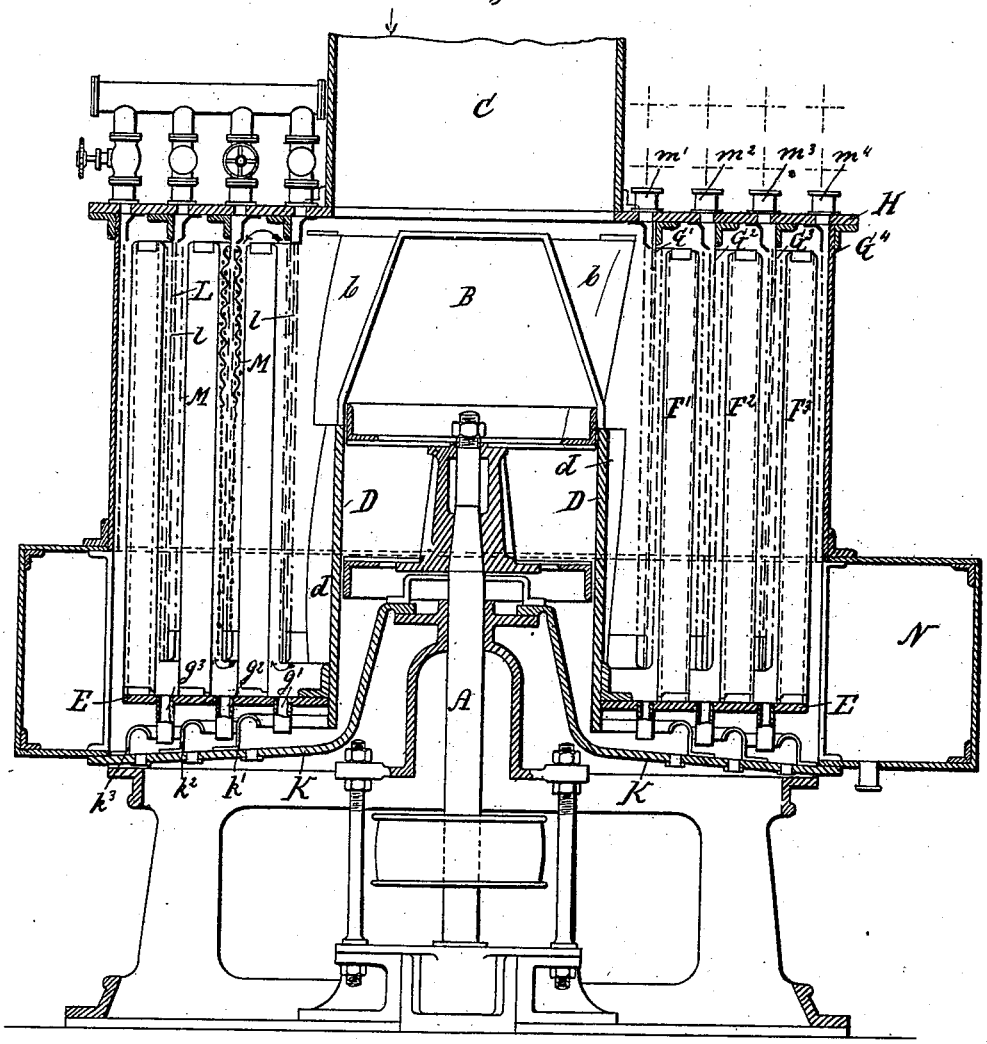

No. 689,246. Patented Dec. 17, 1901.
E. THEISEN.
PROCESS OF PURIFYING GAS.
(Application filed Jan. 21, 1899.)
(No Model.) 3 Sheets—Sheet 1.

No. 689,246. Patented Dec. 17, 1901.
E. THEISEN.
PROCESS OF PURIFYING GAS.
(Application filed Jan. 21, 1899.)

(No Model.) 3 Sheets—Sheet 2.

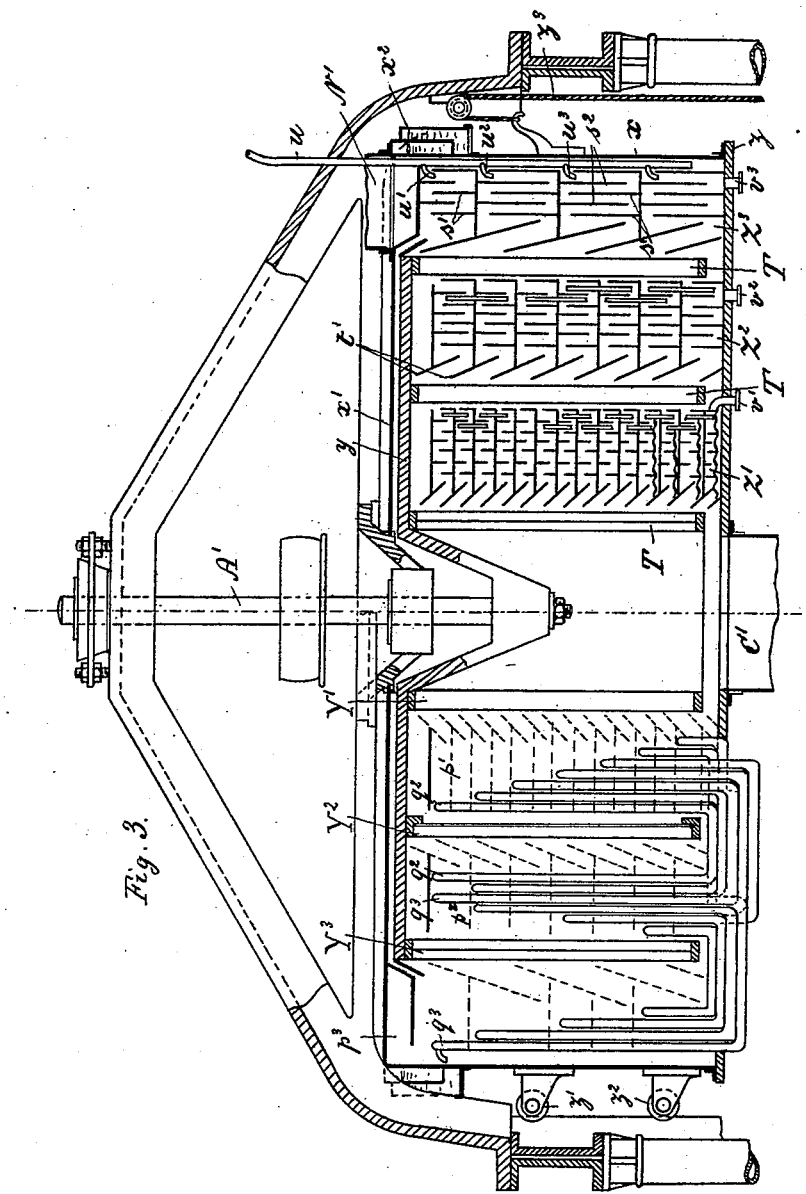

United States Patent Office.

EDWARD THEISEN, OF BADEN BADEN, GERMANY.

PROCESS OF PURIFYING GAS.

SPECIFICATION forming part of Letters Patent No. 689,246, dated December 17, 1901.

Application filed January 21, 1899. Serial No. 702,947. (No specimens.)

*To all whom it may concern:*

Be it known that I, EDWARD THEISEN, mechanical engineer, residing at Baden Baden, in the Grand Duchy of Baden, Germany, have invented new and useful Improvements in the Purification of Gases and Separation of By-Products, of which the following is a specification.

Various methods have been proposed for obtaining an energetic reciprocal action between gases and liquids brought in contact by centrifugal action. In many cases the action of the gases merely upon the surface of the liquid is not sufficient, even when such surface is increased by imparting a corrugated form thereto.

The present invention has for its object to produce a more energetic reciprocal action between gases and liquids; and it relates more particularly to the treatment of waste gases from coke-ovens and the like for the purpose of effecting the rapid purification and cooling thereof, as also for obtaining strong ammonia and benzene, which operations require a much more intense reaction between the gas and water than was possible with apparatus heretofore proposed—at any rate if it be desired to carry out the process with moderate-sized apparatus. The absorbing and cooling property of the washing liquid when operating during a very short time is increased according to the present invention by producing at the first contact of the hot gases and the liquid a strong evaporation accompanied, if necessary, with pulverization of the washing liquid. In thus producing a very intimate mixture of the waste gases to be treated with the steam produced the action is greatly increased by, to a certain extent, a minute division of the bodies, and by this means the absorption of the ammonia is considerably accelerated and the cooling is greatly facilitated. The process therefore has to be so conducted in the first division of a centrifugal apparatus that an energetic evaporation and intermixture of the produced steam with the waste gases can take place—that is to say, as little washing liquid must be supplied as possible. It will be advisable to heat this in the first instance by suitable means either externally to or within the centrifugal apparatus, and arrangements must be provided to cover a maximum extent of surface with a minimum quantity of water or other washing or absorbing liquid. The ideal arrangement would be that only so much water is supplied as is required for evaporation, so that in this first division no discharge of liquid would take place. This, however, cannot be practically attained. At the second stage of the process, on the other hand, a strong cooling action is sought to be attained, whereby the previously-generated steam is condensed, together with the constituents absorbed thereby. This condensation can also be effected by simple surface action, producing an effectual separation of the watery particles. By such a treatment of the coke-oven gases washing liquors are obtained which are to a considerable extent enriched with ammonia, but not so perfectly as is desirable both for its advantageous subsequent utilization and for purifying the gases to the greatest extent. For this purpose the said washing liquid is subjected to a second treatment by centrifugal action, together with the gases, in such manner that the gases are made to penetrate through the liquid over extended surfaces, the arrangement being such that the weaker liquid is brought in contact in the outer compartments of a centrifugal apparatus with the most purified gases and in then traveling in the direction toward the axis of the apparatus become more and more enriched by contact with the more impure gases. In particular the arrangement is such that several concentric stationary compartments are provided, consisting of siphon-like cells, and that in the spaces between the compartments centrifugal blades are made to revolve, which exercise on the inner side a sucking action and on the outer side a forcing action on the gases. In this way it is possible not only to force the gases through all the cells of all the compartments from the interior to the exterior, but also at the same time to produce a continuous flow of the liquid from the outer compartments to the inner ones on account of the increasing pressure toward the outside producing a difference of liquid-level in the inner and outer cells. By this means the requisite reversed direction of the gas and liquid is obtained.

On the accompanying drawings are shown, by way of example, two apparatus by means of which the two stages of the process can be carried out.

Figure 2:
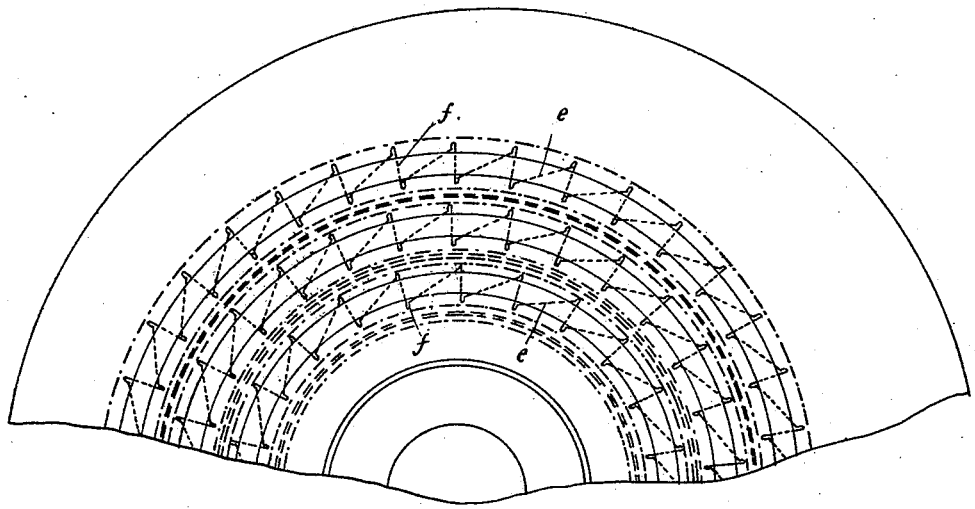
Figure 4:
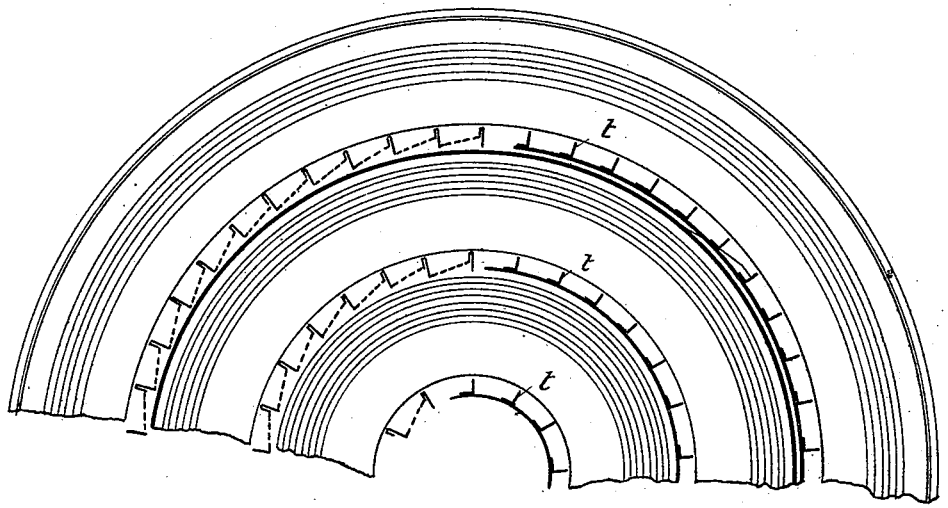

Figure 1 shows a vertical section of the initial apparatus. Fig. 2 is a sectional plan of Fig. 1. Fig. 3 shows a vertical section, and Fig. 4 a sectional plan, of the second-described apparatus.

In Fig. 1, A is the shaft of the centrifugal apparatus, on the upper end of which is mounted a conical head B, with vanes $b$, which, owing to their conical form, draw the gases downward from the pipe C and impart centrifugal motion to said gases. To the head B is fixed the cylindrical part D, which carries blades $d$ and the plate E. On this plate are the centrifugal devices $F'$ $F^2$ $F^3$, composed of oblique blades $e$ (see Fig. 2) and radial pieces $f$, forming a closed ring. These rings revolve in chambers formed by fixed walls $G'$ $G^2$ $G^3$ $G^4$, depending from a plate H. Beneath these walls and the plate E is a bottom plate K, on which are formed annular channels by means of the partitions $k'$ $k^2$ $k^3$. Into these annular channels project the discharge-nozzles $g'$ $g^2$ $g^3$, fixed to the rotary plate E and serving to discharge the liquid flowing off the walls $G'$ $G^2$ $G^3$ into the channels of plate K. The gas drawn in by the blades $b$ and propelled thereby with centrifugal action is subjected to further centrifugal action by the blades $d$ and passes outwardly in a zigzag direction through the several chambers of the apparatus, as indicated by the arrows at the left of Fig. 1. The centrifugal devices $F'$ $F^2$ $F^3$ operate herein with a twofold action. They not only propel the gases outward in the known manner, so as to produce an energetic reciprocal action between them and the liquid on the walls $G'$ $G^2$ $G^3$, as hereinafter set forth, but it has also been found that owing to the peculiar combination of oblique and radial parts $e$ and $f$ on the walls an increased gas-pressure in the inward direction is produced, though not so high a pressure as the outwardly-directed one, provided that the radial parts project near enough to the liquid. By imparting a suitable inclination to these parts $e$ and $f$ the up-and-down motion of the gas can be increased. It will be seen that by this twofold action of the centrifugal devices a very powerful action can be produced in a very small space.

The several walls $G'$ $G^2$ $G^3$ consist each of a thin main body L, into the hollow space of which the liquid flows through the nozzles $m'$ $m^2$ $m^3$ $m^4$. The hollow space thus formed is provided with openings $l$, so that the liquid can issue on both sides. The surfaces onto which it flows are suitably formed for producing the greatest possible surface distribution of a thin layer of liquid over very extended surfaces, and for this purpose they may be, for example, provided with narrow transverse ribs, or preferably they are covered with wire-gauze M. The supply of liquid is so regulated that as little as possible is made to flow through the nozzle $m'$, and this should be as hot as possible. In some cases the wall $G'$ may be provided with a heating-coil on its inner side. The liquid, which is generally water, evaporates rapidly, and thereby cools the gas, the steam formed becoming intimately mixed therewith. Any water that may flow off, which will contain ammonia if coke-oven gases are being treated, passes through the tube $g'$ in the innermost annular channel onto the plate K. Through the tubes $m^2$ $m^3$ larger quantities of water are introduced. The gases will have become considerably cooled by the above-described means, so that on the surfaces of the walls $G^2$ $G^3$ a complete condensation of the aqueous vapors will be effected, together with a considerable quantity of the absorbed ammonia. The liquor thus produced will run into the two outer annular channels. The outer surface $G^4$ is either not supplied at all with water, or if it is so supplied (by tube $m^4$) it is advisable to cover the surface of the water with a fine sieve in such manner that the particles of liquid still contained in the gases are thrown off by centrifugal action behind the sieve, but that the liquid is not materially disturbed by a direct impact of the gases thereon. This last chamber can therefore be considered as a drying-chamber. From it the gases escape into the discharge-channel N, which leads them to the second centrifugal apparatus.

The second centrifugal apparatus (see Figs. 3 and 4) consists of three concentrically-arranged stationary cellular cylindrical bodies $Z'$ $Z^2$ $Z^3$, carried by the base-plate $z$ and capable of being raised and lowered, together with the same, by means of suspension cords or chains $z^3$, of which there are several passing over guide-rollers $z^4$, the wheels $z'$ $z^2$ serving to guide the movable parts in their up-and-down movement. The rotating parts of the centrifugal apparatus are carried by the shaft $A'$ and consist of the centrifugal devices $Y'$ $Y^2$ $Y^3$, which depend from the plate $y$. These centrifugal devices travel between the cellular bodies $Z'$ $Z^2$ $Z^3$ within a casing formed by the base-plate $z$, the cylindrical part or casing $x$, and the cover-plate $x'$, which are stationary. The latter does not move up and down with the former, and when the apparatus is at work a water seal is made with the cylinder $x$ at $x^2$ within the annular trough $x^3$. Into the cellular bodies the cooled ammonia liquor coming from the first apparatus is charged and is made to flow in the contrary direction to the gases which enter centrally through the pipe $C'$, the liquor being made to pass from the outer body $Z^3$ through the middle one $Z^2$ to the inner one $Z'$. The gases pass off through the pipe $N'$.

The several centrifugal devices $Y'$ $Y^2$ $Y^3$ consist of annular bodies, which may have fan-blades $t$ arranged at intervals and connected together at top and bottom by the rings T. These bodies can, however, be of any desired form which will act both as centrifugal blades with considerable pressure upon the gas and will allow the gases free passage in a radial direction. The blades can therefore also consist, for example, of sheet-metal cylinders, the surfaces of which are so bent as to form radial ribs or blades, while the parts between these are formed with sieve-like perforations. These perforated parts can be placed obliquely, so as to have a centrifugal action on the gases. In any case the action of the rotation will be such that a strong suction is produced on the inner side of the centrifugal devices, while a pressure is produced on the outer side. This effect is utilized for forcing the gases entering at $C'$ through the washing and absorbing liquor in the cellular bodies.

The cells consist of a series of siphon-like compartments arranged in stages one above the other, being formed in the simplest arrangement by means of annular horizontal plates $s$, on which are mounted partitions $s'$, while other partitions $s^2$ depend between these from the plate $s$ above. The several stages of these compartments are also provided with guiding-plates $t'$, which approach near to the centrifugal devices and serve to direct the gas-currents into the first cell. On account of the above-described conditions of pressure and in consequence of the combined suction and pressing actions the washing liquor will assume such positions in the several cells that the column of liquor situated in the space on the outer side of the partition $s^2$ will be higher than the liquor on the inner side thereof, which will, however, cover the lower edge of the partition $s^2$, so that the gas is forced by the pressure to pass through the liquor in order to travel consecutively through the several compartments. By this means the ammonia of the gas will be completely taken up by the liquor. Upon the number of stages employed and the narrowness of the several cells will evidently depend the number of times the gas is made to pass into and out of the separate bodies of the liquor, and consequently the extent of liquid surfaces with which the gas is brought into contact. In the arrangement shown the action of the outer centrifugal device $Y^3$ will be considerably stronger than that of the inner one $Y^2$, and the action of $Y^2$ will be stronger than that of $Y'$. The result of this will be that the difference of level of the washing liquor in the two parts of a cell will be greater in the outer compartment than in the inner compartment—that is, the column of liquid will be higher in the former than in the latter. This causes the flow of the washing liquor to take place in the inward direction from the outer cells—that is to say, in the contrary direction to that of the flow of the gas—whereby the perfect absorption of the absorbable constituents of the gas is greatly facilitated. This can be effected by a simple tubular communication between the cells, as shown on the left-hand side of Fig. 3. From the outer cell $p^3$ a discharge-pipe $q^3$ passes to the cell $p^2$ of the next inner cellular body, and from this a pipe $q^2$ passes to the cell $p'$ of the innermost body. These tubular connections are repeated for each of the several stages. As the volume of the stages increases toward the outer part, it will be evident that several inner stages can be supplied from one outer one, or the liquor can be made to overflow the upper inner stage to the next one below. It is consequently only requisite to supply the outermost cellular bodies with the washing liquor and to lead the liquor away from the innermost one if it be not desired to obtain several liquors of different strength. A pipe $u$ is provided for supplying liquid, which, by means of branches $u'\ u^2\ u^3$, supplies the outer cells with the washing liquor. $v'\ v^2\ v^3$ are the discharge-pipes for the liquor.

It will be seen from the above description that the invention can be applied in variously-modified ways, according to the nature of the gases treated and the by-products to be obtained therefrom. It is particularly to be observed that the production of vapor and the condensation thereof not only operates energetically with a cooling and absorbing action, but also effects the separation of dust. Instead of water other absorbent liquids can be used. Thus with coke-oven gases it may be a question of absorbing the benzene, while when treating illuminating-gases the benzene should be retained in the latter. On account of its combined suction and purifying action the apparatus shown in Fig. 1 may, for example, also be used for treating the waste gases from steam-boiler furnaces for the purpose of simultaneously producing a good draft and for separating and absorbing carbonaceous and other constituents from the gases. When coke-oven gases are treated, the washing liquors passing off from the first compartment will also contain tarry constituents, which are first separated by the centrifugal process, as described, after which the washing liquor employed is passed through the second-described apparatus.

Now what I claim, and desire to secure by Letters Patent, is the following:

1. The herein-described process of purifying gases and obtaining absorption liquors and the like, consisting in the causing of liquid to flow over a series of stationary surfaces, introducing gases into the apparatus and producing an energetic reciprocal action between the gas and the liquid by means of centrifugal action so as to bring the gas repeatedly into contact with successive fresh layers of liquid, whereby a considerable vaporization of the liquid will be effected and the intimate mixture of such vapor with the gas, subjecting the said mixture of gas and vapor to a condensing process and effecting a further absorption by causing the gas to travel outward from a center and bringing the condensed liquid heretofore mentioned toward the said center, the gas bubbling through the liquid outward from the said center, while the liquid is moving inward.

2. In the process of purifying gases and obtaining absorption liquors and the like, the subprocess which consists in causing the gas to travel outward from a center by subjecting the same to centrifugal action thereby causing outward pressure of the gases, passing the said gases through liquid bodies to thereby change the liquid-levels in different parts of the apparatus, the liquid-level of the outer portion of the apparatus being higher than that of the inner portion whereby the liquid will be given a tendency to and will execute an inward flow in a direction opposite to that of the gases, substantially as described and for the purposes set forth.

In testimony whereof I have signed my name to this specification in the presence of two subscribing witnesses.

EDWARD THEISEN.

Witnesses:
MAX ADLER,
MAX J. BAEHR.